United States Patent [19]
Kotick et al.

[11] 3,870,700
[45] Mar. 11, 1975

[54] 2-HALOGENO-2-DEOXY-5-(SUBSTITUTED)URIDINES

[75] Inventors: Michael Paul Kotick; Joseph Odo Polazzi, both of Elkhart, Ind.

[73] Assignee: Miles Laboratories, Inc., Elkhart, Ind.

[22] Filed: May 29, 1973

[21] Appl. No.: 364,700

[52] U.S. Cl............................ 260/211.5 R, 424/180
[51] Int. Cl............................................. C07d 51/52
[58] Field of Search ............................ 260/211.5 R

[56] References Cited
UNITED STATES PATENTS

| | | | |
|---|---|---|---|
| 3,463,850 | 8/1969 | Shen et al. | 260/211.5 R |
| 3,687,931 | 8/1972 | Verheyden et al. | 260/211.5 R |
| 3,775,397 | 11/1973 | Etzold et al. | 260/211.5 R |

Primary Examiner—Johnnie R. Brown

[57] ABSTRACT

Compounds of the formula

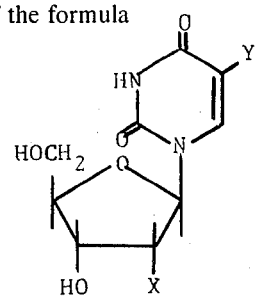

in which X is halogeno and Y is halogeno, thiocyanato, are useful as antiviral agents or as intermediates in the synthesis of biologically active nucleosides, nucleotides or polynucleotides.

4 Claims, No Drawings

2-HALOGENO-2-DEOXY-5-(SUBSTITUTED)URIDINES

SUMMARY

Compounds of the formula

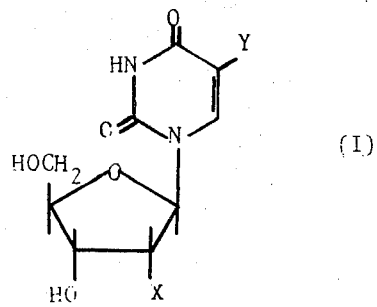

wherein X is halogeno and Y is halogeno, thiocyanato, comprise the subject matter of this invention.

Preferred embodiments of these compounds include:
1. 2'-fluoro-2'-deoxy-5-fluoro-uridine;
2. 2'-chloro-2'-deoxy-5-fluoro-uridine;
3. 2'-bromo-2'-deoxy-5-fluoro-uridine;
4. 2'-fluoro-2'-deoxy-5-chloro-uridine;
5. 2'-chloro-2'-deoxy-5-chloro-uridine;
6. 2'-bromo-2'-deoxy-5-chloro-uridine;
7. 2'-fluoro-2'-deoxy-5-bromo-uridine;
8. 2'-chloro-2'-deoxy-5-bromo-uridine;
9. 2'-bromo-2'-deoxy-5-bromo-uridine;
10. 2'-fluoro-2'-deoxy-5-iodo-uridine;
11. 2'-chloro-2'-deoxy-5-iodo-uridine;
12. 2'-bromo-2'-deoxy-5-iodo-uridine;
13. 2'-fluoro-2'-deoxy-5-thiocyanato-uridine;
14. 2'-chloro-2'-deoxy-5-thiocyanato-uridine;
15. 2'-bromo-2'-deoxy-5-thiocyanato-uridine;
16. 2'-fluoro-2'-deoxy-5-mercapto-uridine;
17. 2'-chloro-2'-deoxy-5-mercapto-uridine;
18. 2'-bromo-2'-deoxy-5-mercapto-uridine;
19. 2'-fluoro-2'-deoxy-5-disulfhydryl-uridine;
20. 2'-chloro-2'-deoxy-5-disulfhydryl-uridine;

Compounds having Formula I can be prepared according to the following reaction sequence:

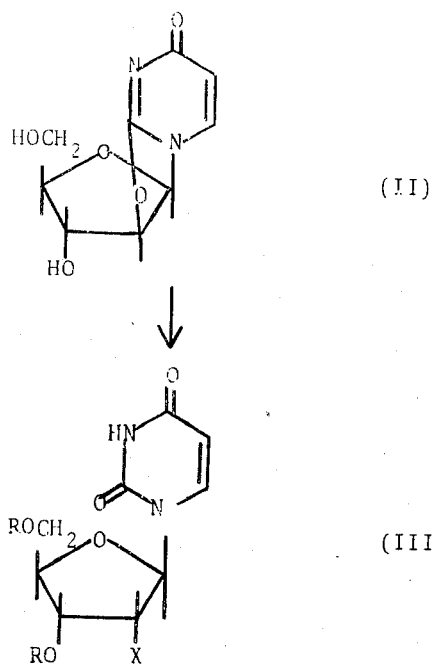

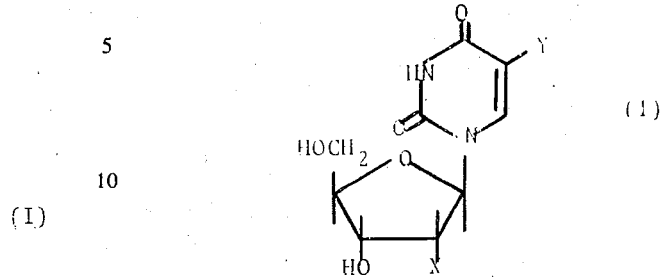

In the above series of reactions, X and Y are groups as defined above for Formula I; R represents hydrogen or acetyl substituents.

The synthesis of 2,2'-anhydro-1-($\beta$-D-arabinofuranosyl) uracil (Formula II) and its conversion to 2'-halogeno-2'-deoxyuridine substituted at either the 5' or 4' position (Formula III) can be performed according to published methods (Codington et al., J. Org. Chem., 29: 558 [1964]; Codington et al., J. Org. Chem., 29: 564 [1964]; Doerr et al., J. Org. Chem., 32: 1462 [1967]; and Cushley et al., Can. J. Chem., 46: 1131 [1968]). The 2'-fluoro-2'-deoxy-cytidine analogues of Formula II, however, were prepared by the procedure of Hendler and co-workers (Abstracts, 162nd National Meeting of the American Chemical Society, September, 1971, No. Biol. 20) or of Shannahoff and Sanchez (J. Org. Chem., 38: 593 [1973]).

The conversion of Formula III to Formula I can be accomplished by the following methods: the 5-fluoro analogues were prepared according to the reaction described by Robins and Naik (J. Amer. Chem. Soc., 93: 5277 [1971]; Chem. Comm., 18 [1972]); 5-chloro and 5-bromo derivatives were made by the pathway described by Fukuhyana and Visser (J. Biol. Chem., 190: 95 [1951]); 5-iodo compounds were synthesized according to Prusoff et al., (Cancer Res., 13: 221 [1953]; Biochim. Biophys. Acta, 32: 295 [1959]); and the 5-thiocyanato derivatives were prepared by the method of Waters and Witkop (Chem. Comm., 1025 [1972]).

Compounds having Formula I have varying antiviral activity, relative to arabinosylcytosine, a known inhibitor of DNA viruses.

Screening was conducted with Herpes Simplex Virus Type 2 (HSV, a DNA virus) in VERO cells (African green monkey kidney) and the Indiana Strain of Vesicular Stomatitis Virus (VSV, and RNA virus) in mouse L cells. The virus was allowed to adsorb to the cells for 1 hour after which the cells were washed once with medium and the test compound then added in serum-free medium. After a 16 hour incubation in the presence of the test compound, the supernatant was collected and made cell-free by centrifugation. Titration of virus in these preparations was done in the appropriate host cells. All compounds were tested at 0.32 M.

DESCRIPTION OF THE PREFERRED EMBODIMENTS

Examples 1-3

5-Fluoro-2'-Halogeno-2'-Deoxyuridines

The following 5-fluoro-2'-halogeno-2'-deoxyuridines were prepared according to the procedure published by Robins and Naik (Chem. Comm., 18 [1972]) from corresponding 2′-halogeno-2′-deoxy-3′,5′-di-O-acetyl-uridine.

A solution of the appropriate diacetate, 4 mmoles in 1:1 $CFCl_3$:$CHCl_3$ (70 ml), was cooled in a $CO_2$-$Me_2CO$ bath and treated with a slow stream of $CF_3OF$ for 5 minutes (3–5 g). The cooling bath was removed, and the solution warmed to room temperature and evaporated. The residue was treated with 10% TEA in MeOH:$H_2O$ (1:1, 50 ml) for 1–2 hours. Evaporation followed by chromatography on silica gel yielded a foam. 5-fluoro-2′-fluoro-2′-deoxyuridine ($C_9H_{10}F_2N_2O_5$) was obtained in 60% yield. Crystallization from EtOH gave an analytical sample, m.p. 148°–151°. 5-fluoro-2′-chloro-2′-deoxyuridine ($C_9H_{10}ClFN_2O_5$) yielded 53% of a foam. Crystallization from EtOH gave an analytical sample with m.p. 97°–100°.

5-fluoro-2′-bromo-2′-deoxyuridine ($C_9H_{10}BrFN_2O_5$). Due to the base instability of the parent nucleoside, the adduct was decomposed and deacetylated by use of concentrated HCl (5 ml) in MeOH (25 ml) for 5 hours. Removal of the solvent and residual HCl by azeotropic distillation with EtOH:PhH was followed by chromatography to give the desired product as a foam in 26% yield. Crystallization was effected from EtOH to give an analytical sample, m.p. 97°–100°.

| Formula | Calculated for C | H | N | Found C | H | N |
|---|---|---|---|---|---|---|
| $C_9H_{10}F_2N_2O_5$ | 40.91 | 3.81 | 10.60 | 41.27 | 3.99 | 10.46 |
| $C_9H_{10}ClFN_2O_5$ | 38.51 | 3.59 | 9.98 | 38.32 | 3.83 | 9.84 |
| $C_9H_{10}BrFN_2O_5$ | 33.25 | 3.81 | 8.62 | 33.43 | 3.44 | 8.64 |

Examples 4–6

5-Chloro-2′-Halogeno-2′-Deoxyuridines

The 5-chloro-2′-halogeno-2′-deoxyuridine derivatives described below were obtained from 2′-halogeno-2′-deoxy-uridines by the method reported by Fukuhyana and Visser (J. Biol. Chem., 190: 95 [1951]).

To a stirred suspension of the appropriate nucleoside (2mmole) in glacial HOAc (35 ml) was added a 4-fold excess of $Cl_2$ in $CCl_4$ (10 ml). Stirring was continued at room temperature for 30–60 minutes during which solution occurred. After evaporation, the residue was azeotroped with absolute EtOH, then absolute EtOH:PhH. The resulting syrup was chromatographed on silica gel ($CHCl_3$:MeOH, 6:1 or 8:1) and the product isolated as a homogeneous foam. 5-Chloro-2′-fluoro-2′-deoxyuridine ($C_9H_{10}ClFN_2O_5$) was obtained in 60% yield. Crystallization from absolute EtOH gave an analytical sample as white crystals, m.p. 130°–135°. 5-Chloro-2′-chloro-2′-deoxyuridine ($C_9H_{10}Cl_2N_2O_5$) was crystallized from absolute EtOH to give pure material, m. p. 210°–212°. 5-Chloro-2′-bromo-2′-deoxyuridine ($C_9H_{10}ClBrN_2O_5$), m.p. 195°–197°, was obtained in two crops (47 %) from EtOAc.

| Formula | Calculated for C | H | N | Found C | H | N |
|---|---|---|---|---|---|---|
| $C_9H_{10}ClFN_2O_5$ | 38.51 | 3.59 | 9.98 | 38.26 | 3.61 | 8.63 |
| $C_9H_{10}Cl_2N_2O_5$ | 36.38 | 3.39 | 9.43 | 36.38 | 3.47 | 9.43 |
| $C_9H_{10}BrClN_2O_5$ | 31.65 | 2.95 | 8.20 | 32.02 | 2.97 | 8.07 |

Examples 7–9

5-Bromo-2′-Halogeno-2′-Deoxyuridines

Bromination of 2′-halogeno-2′-deoxyuridine by using bromine in aqueous solution yielded corresponding 5-bromo-2′-halogeno-2′-deoxyuridines after the procedure of Fukuhyana and Visser (J. Biol. Chem., 190: 95 [1951]).

To a solution of the corresponding nucleoside in $H_2O$ was added $Br_2$-Br water until a permanent yellow solution was obtained. After stirring 30 minutes, the solution was aerated until colorless, the solvent removed and the syrup azeotroped with absolute EtOH:PhH. The residue was refluxed in absolute EtOH for 30–60 minutes and the solution evaporated to dryness. 5-Bromo-2′-fluoro-2′-deoxy-uridine ($C_9H_{10}BrFN_2O_5$) was obtained as a foam in 52%. Crystals, m.p. 162°–165°, were obtained from absolute EtOH. 5-Bromo-2′-chloro-2′-deoxyuridine ($C_9H_{10}BrClN_2O_5$) solidified on trituration with $CHCl_3$:MeOH to give crystals, 1.56 g (60%), m.p. 212°–216°. Recrystallization twice from absolute EtOH gave pure material, m.p. 213°–216°. 5-Bromo-2′-bromo-2′-deoxyuridine ($C_9H_{10}Br_2N_2O_5$) was obtained in crystalline form, m.p. 187°–189°, after chromatography and crystallization from EtOAc.

| Formula | Calculated for C | H | N | Found C | H | N |
|---|---|---|---|---|---|---|
| $C_9H_{10}BrFN_2O_5$ | 33.25 | 3.10 | 8.62 | 33.41 | 3.17 | 8.58 |
| $C_9H_{10}BrClN_2O_5$ | 31.65 | 2.95 | 8.20 | 32.01 | 2.98 | 8.08 |
| $C_9H_{10}Br_2N_2O_5$ | 28.00 | 2.61 | 7.26 | 28.21 | 2.79 | 7.13 |

Examples 10–12

5-Iodo-2′-Halogeno-2′-Deoxyuridines

The 5-iodo-2′-halogeno-2′-deoxyuridines which follow were synthesized pursuant to Prusoff et al., (Cancer Res., 13: 221 [1953]; Biochim. Biophys. Acta, 32: 295 [1959]). In lieu of $I_2$ in acid-water-chloroform, however, N-iodo-succinimide was utilized for a more effective reaction.

To a hot solution of the corresponding 2′-halogeno-

2'-deoxyuridine (2mmole) in glacial HOAc (10 ml) was added N-iodo succinimide (3 mmole). Heating was continued on the steam bath 30–60 minutes, the solution cooled and evaporated. The residue was chromatographed using $CHCl_3$:MeOH (6:1 or 8:1) as the eluent. 5-Iodo-2'-fluoro-2'-deoxy-uridine ($C_9H_{10}FIN_2O_5$) was obtained as a white solid (47%), m.p. 215°–218°. 5-Iodo-2'-chloro-2'-deoxyuridine ($C_9H_{10}ClIN_2O_5$) was obtained in a yield of 31%, and was recrystallized from $H_2O$ to give pure material; the melting point was indefinite with evolution of $I_2$ at 180°. 5-Iodo-2'-bromo-2'-deoxyuridine ($C_9H_{10}BrIN_2O_5$) was obtained in 25% yield and was recrystallized from $CHCl_3$:MeOH (8:1) to give an analytical sample, m.p. 179°–182° with evolution of $I_2$.

| Formula | Calculated for | | | Found | | |
|---|---|---|---|---|---|---|
| | C | H | N | C | H | N |
| $C_9H_{10}FIN_2O_5$ | 29.05 | 2.71 | 7.53 | 29.25 | 2.81 | 7.60 |
| $C_9H_{10}ClIN_2O_5$ | 27.82 | 2.59 | 7.21 | 27.92 | 2.67 | 7.36 |
| $C_9H_{10}BrIN_2O_5$ | 24.96 | 2.32 | 6.47 | 25.22 | 2.39 | 6.49 |

Examples 13–15

2'-Halogeno-2'-Deoxy-5-Thiocyanato-Uridines

2'-Chloro-2'-deoxy-5-thiocyanato-uridine: To a cold solution of $Cl_2$ (2.82 g, 40 mmoles) in dry HOAc (100 ml) was added KSCN (4.86 g, 50 mmoles) and the resultant mixture was filtered and to the filtrate was added 2'-chloro-2'-deoxyuridine (1.07 g, 4 mmoles). After stirring for 30 minutes, cyclohexene (20 ml) was added and stirring continued for an additional 15 minutes. After evaporation of the solvent in high vacuum (30°), the brown residue was triturated, first with petroleum ether, then ether. The residual material was taken up in hot absolute EtOH, charcoaled, filtered and evaporated. The residue was chromatographed on silica gel using 7:1 $CHCl_3$:MeOH as the eluent. The major fractions were impure; the material was recombined and rechromatographed using 8:1 $CHCl_3$:MeOH. Crystallization of the major component was effected from EtOH ether to give crystals, m.p. 183°–185°. Drying in vacuo at 60° gave an analytical sample. For other details refer to procedure of Waters and Witkop (Chem. Comm., 1025 [1972]).

Calculated for $C_{10}H_{10}ClN_3O_5S$: C, 37.56; H, 3.15; N, 13.14
Found: C, 37.86; H, 2.93; N, 12.80
UV, $\lambda_{max}$ (MeOH) 272 m$\mu$. IR, $_{max}$ (SCN) 2160 cm$^{-1}$ (KCl).

2'-Bromo-2'-deoxy-5-thiocyanato-uridine: In a similar manner, the mentioned compound was obtained as a clear syrup after chromatography which solidified upon trituration with ether to give a homogeneous solid in 44% yield. Recrystallization from MeOH gave pure white crystalline material with m.p. 171°–174°.

Calculated for $C_{10}H_{10}BrN_3O_5S$: C, 32.98; H, 2.77; N, 11.54
Found: C, 32.72; H, 2.70; N, 11.68
UV $\lambda_{max}$ (MeOH) 272 m$\mu$. IR, $\gamma$ 2160 cm$^{-1}$ [KCl].

2'-Fluoro-2'-deoxy-5-thiocyanato-uridine was similarly prepared.

What is claimed is:

1. A compound having the formula

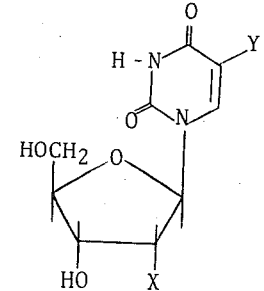

wherein:

X is selected from substituents consisting of fluoro, chloro, and bromo; and,

Y is thiocyanato.

2. A compound as in claim 1, 2'-fluoro-2'-deoxy-5-thiocyanato-uridine.

3. A compound as in claim 1, 2'-chloro-2'-deoxy-5-thiocyanato-uridine.

4. A compound as in claim 1, 2'-bromo-2'-deoxy-5-thiocyanato-uridine.

* * * * *